United States Patent [19]
Ikeno

[11] Patent Number: 5,410,539
[45] Date of Patent: Apr. 25, 1995

[54] COMMUNICATION APPARATUS AND METHOD

[75] Inventor: Toshihiko Ikeno, Yokohama, Japan

[73] Assignee: Canon Kabushiki Kaisha, Tokyo, Japan

[21] Appl. No.: 22,546

[22] Filed: Feb. 25, 1993

[30] Foreign Application Priority Data

Feb. 27, 1992 [JP] Japan .................. 4-041400

[51] Int. Cl.⁶ .................. H04J 3/12; H04M 3/42; H04M 7/00; H04M 11/00
[52] U.S. Cl. .................. 370/58.1; 370/61; 370/79; 370/110.1; 379/94; 379/211; 379/234
[58] Field of Search .................. 370/54, 58.1, 60, 60.1, 370/62, 79, 85.13, 94.1, 110.1, 61; 379/67, 88, 93, 94, 96, 100, 112, 201, 210, 211, 212, 215, 231, 234, 242, 245, 258, 207, 268, 271, 272

[56] References Cited

U.S. PATENT DOCUMENTS

| | | | |
|---|---|---|---|
| 4,879,743 | 11/1989 | Burke et al. | 379/201 |
| 4,996,704 | 2/1991 | Brunson | 379/67 |
| 5,008,884 | 4/1991 | Yazawa | 370/110.1 |
| 5,046,183 | 9/1991 | Dorst et al. | 370/110.1 |
| 5,119,415 | 6/1992 | Aoyama | 379/207 |
| 5,185,741 | 2/1993 | Iguchi et al. | 370/110.1 |
| 5,189,695 | 2/1993 | Maei | 370/110.1 |
| 5,233,648 | 8/1993 | Nakamura | 370/110.1 |

*Primary Examiner*—Alpus Hsu
*Attorney, Agent, or Firm*—Morgan & Finnegan

[57] ABSTRACT

A PBX incorporates a table for storing information indicating whether a calling mode of each extension terminal designates an extension or a trunk. Upon reception of an incoming call from an ISDN, the PBX checks whether a calling party number is included in the "set-up" message. If a calling party number is included, the PBX checks the calling mode of an extension terminal as a called party by referring to the table. If the default designates an extension, the PBX adds a trunk access code to the calling party number in the "set-up" message, and sends the resultant number to the terminal as the called party. If, therefore, the terminal which receives the incoming call has a function of generating a call to the party of the stored calling party number, the terminal can generate an outgoing call regardless of whether the calling mode of the terminal designates a trunk or an extension.

14 Claims, 8 Drawing Sheets

FIG. 2

CALLING MODE STORAGE TABLE

| EXTENSION TERMINAL NUMBER | CALLING MODE |
|---|---|
| 1 | EXTENSION |
| 2 | TRUNK |
| ⋮ | ⋮ |
| n | EXTENSION |

FIG. 3

FORMAT OF SET-UP MESSAGE

| PROTOCOL IDENTIFIER |
|---|
| CALL NUMBER |
| MESSAGE TYPE |
| TRANSFER CAPACITY |
| CHANNEL IDENTIFIER |
| ⋮ |
| CALLING PARTY NUMBER INFORMATION |
| ⋮ |

FIG. 4

FORMAT OF CALLING PARTY NUMBER INFORMATION

| | | |
|---|---|---|
| 0 | CALLING PARTY NUMBER INFORMATION IDENTIFIER | OCTET 1 |
| CALLING PARTY NUMBER LENGTH | | OCTET 2 |
| 0 | NUMBER TYPE / NUMBER PLAN IDENTIFIER | OCTET 3 |
| 1 | DISPLAY IDENTIFIER / 0 0 0 / NETWORK VERIFICATION IDENTIFIER | OCTET 3a |
| 0 | DIGITS OF NUMBER | OCTET 4 |
| SPACE | (IA5 CHARACTER) | |

COMMUNICATION APPARATUS AND METHOD

BACKGROUND OF THE INVENTION

1. Field of the Invention

The present invention relates to a communication apparatus having a function of receiving a calling party number through a network, and a communication method using the same.

2. Prior Art

Upon reception of an incoming call from an integrated service digital network (ISDN) line, a conventional private branch exchange (PBX) connected to an ISDN directly transmits calling party number information to an ISDN extension terminal. Some conventional ISDN terminals have the following function. Upon reception of an incoming call from an ISDN line, this terminal stores calling party number information. When speech communication is completed, and an outgoing call is to be generated with respect to the calling party of the speech communication, the terminal reads out the calling party number from the memory and generates an outgoing call to the calling party of the number.

FIG. 8 shows the arrangement of a conventional PBX. FIG. 9 is a flow chart showing a terminating sequence employed by the PBX.

Referring to FIG. 8, a PBX 603 accommodates an ISDN line 602 as a trunk and is connected to an ISDN 601. A terminal 604 is an ISDN extension terminal of the PBX 603. A basic rate trunk (BRT) 605 is connected to the ISDN line 602 and detects an incoming call to the PBX 603 received via the ISDN 601. A basic rate interface (BRI) 606 is connected to the extension terminal 604 and performs originating/terminating control of the terminal 604. A time switch (TSW) 607 performs connection of a speech channel. A conventional communication controller (CCC) 608 controls the overall PBX 603. When, for example, an incoming call is received, the CCC 608 determines a called party extension, and instructs the BRI 606 to connect the incoming call to the terminal 604 of the called party. Control signals are exchanged between the CCC 608 and the BRT 605, the CCC 608 and the BRI 606, the CCC 608 and the TSW 607, and the like through a control line 609.

In the arrangement shown in FIG. 8, terminating control of an incoming call to the terminal 604 received via the ISDN 601 is performed by the PBX 603 in accordance with the sequence of the flow chart shown in FIG. 9.

When a "set-up" message is sent from the ISDN 601 to the PBX 603 through the ISDN line 602, the BRT 605 detects reception of an incoming call (step S71). Assume that the "set-up" message includes calling party number information, and that a calling party number is the telephone number of the calling party. In this case, assume that the calling number is 037582414. The BRT 605 acknowledges detection of an incoming call to the CCC 608 through the control line 609.

Upon reception of the acknowledgement of an incoming call, the CCC 608 determines an extension as a called party according to a known response scheme (step S72).

Upon recognizing that the called party extension is the extension terminal 604, the CCC 608 instructs the BRI 606 through the control line 609 to connect the incoming call to the extension terminal 604 (step S73).

Upon reception of the connection instruction from the CCC 608, the BRI 606 connects the incoming call to the extension terminal 604 (step S74).

Upon reception of the incoming call, the extension terminal 604 stores the calling party number included in the "set-up" message and displays it on the display. In this case, the calling party number is 037582414.

When the terminating sequence is completed, a corresponding speech line is connected by the TSW 607, and speech communication starts. After the speech communication is completed, the operator can generate an outgoing call from the extension terminal 604 to the calling party of the trunk number "037582414", i.e., the calling party of the previous speech communication, with a simple operation. Whether an extension terminal uses an extension or a trunk to communicate with another party is predetermined, unless otherwise indicated. Such information is called a calling mode. That is, if the calling mode of the extension terminal 604 designates a trunk, the terminal reads out the calling party number stored in step S74, and generates an outgoing call to the party of the read number in accordance with the operation performed by the operator.

According to the conventional sequence, however, if the calling mode of the extension terminal 604 designates an extension, the use of the calling party number "037582414" for the trunk, stored in the memory, leads to an originating error.

SUMMARY OF THE INVENTION

A communication apparatus of the present invention has been made in consideration of the above-described prior art, and comprises reception means for receiving a calling party number through a network, setting means for setting a calling mode of an extension means, and adding means for adding a trunk access code to the calling party number received by the reception means if said setting means sets an extension terminal as the calling party.

In addition, according to the present invention, there is provided a communication apparatus comprising reception means for receiving a "set-up" message including a calling party number from an ISDN, setting means for setting a calling mode of an extension terminal, and informing means for informing the calling party number, to which a trunk access code is added if said setting means sets an extension calling mode, to said extension terminal.

Furthermore, according to the present invention, there is provided a communication apparatus comprising reception means for receiving a distant station number through a network, first storage means for storing the distant station number received by said reception means, second storage means for storing a calling mode of an extension terminal, and adding means for adding a trunk access code to the distant station number stored in said first storage means on the basis of the calling mode stored in said second storage means.

A communication method of the present invention comprises the reception step of receiving a calling party number through a network, the determination step of determining, on the basis of a calling mode of each extension terminal which is stored in a memory, whether a calling mode of an extension terminal designates an extension or a trunk, and the addition step of adding a trunk access code to the calling party number received in the reception step if it is determined in the determination step that the calling mode designates an extension.

In addition, according to the present invention, there is provided a communication method comprising the reception step of receiving a "set-up" message including a calling party number from an ISDN, the determination step of determining whether a calling mode of an extension terminal as a called party which is stored in a memory designates an extension or a trunk, and the informing step of informing the calling party number, to which a trunk access code is added if it is determined in the determination step that the calling mode designates an extension, to said extension terminal.

Furthermore, according to the present invention, there is provided a communication method comprising the reception step of receiving a distant station number through a network, the storage step of storing the distant station number in a memory, and the addition step of adding a trunk access code to the distant station number stored in said memory in the storage step on the basis of a calling mode.

As described above, according to the communication apparatus and method of the present invention, since a trunk access code is added to a calling party number indicating a received distant station number, an originating error can be prevented, which is caused when a call is generated without adding a trunk access code to the distant station number.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a view showing a calling mode storage table;

FIG. 3 is a view showing the format of a set-up message;

FIG. 4 is a view showing the format of a calling party number information;

DETAILED DESCRIPTION OF THE PREFERRED EMBODIMENTS

First Embodiment

FIGS. 1 to 5 show the arrangement of a PBX connected to an ISDN according to a preferred embodiment of the present invention.

Figure 1:
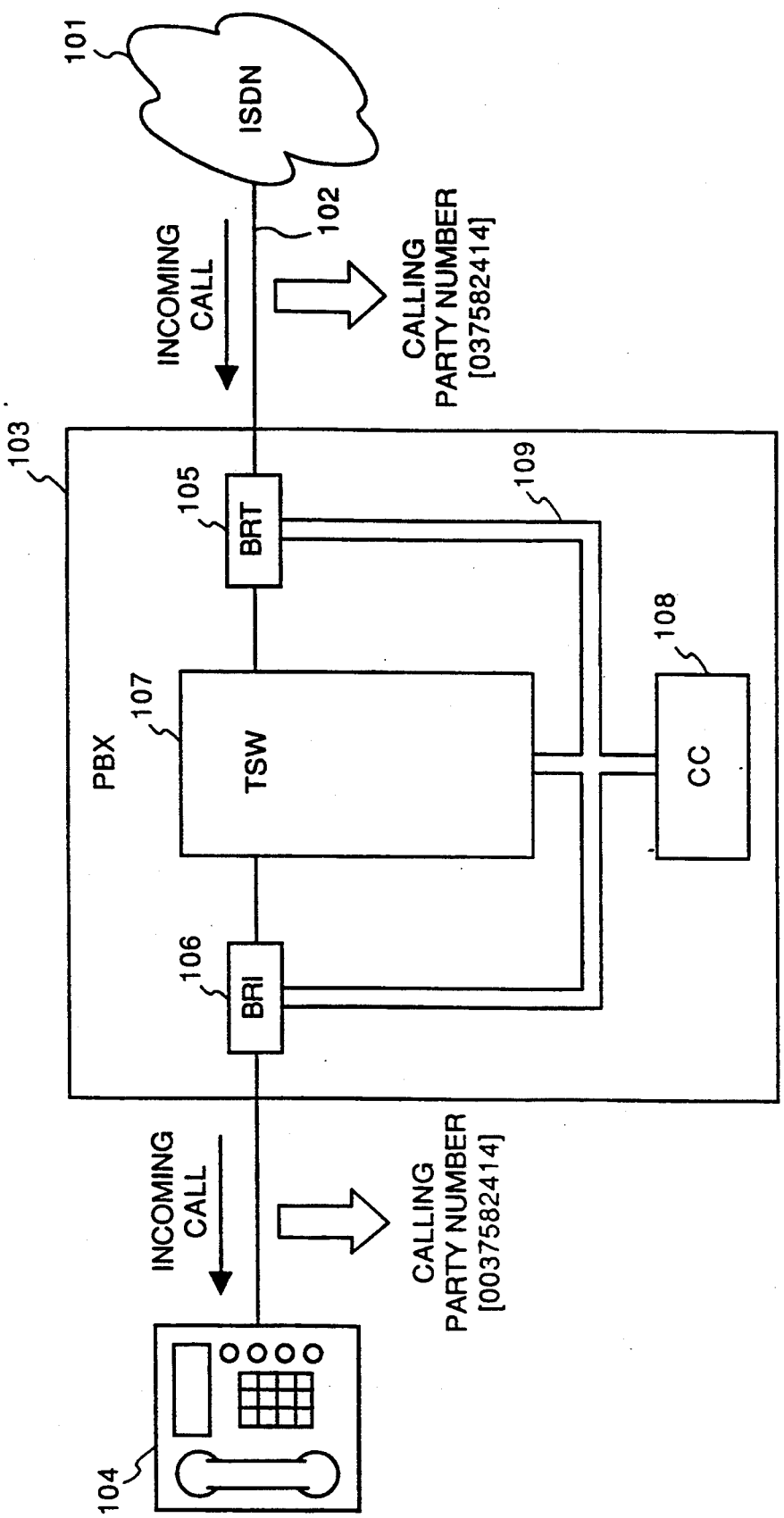
FIG. 1 is a block diagram showing a terminating sequence employed by a private branch exchange according to the first embodiment of the present invention.
Figure 5:
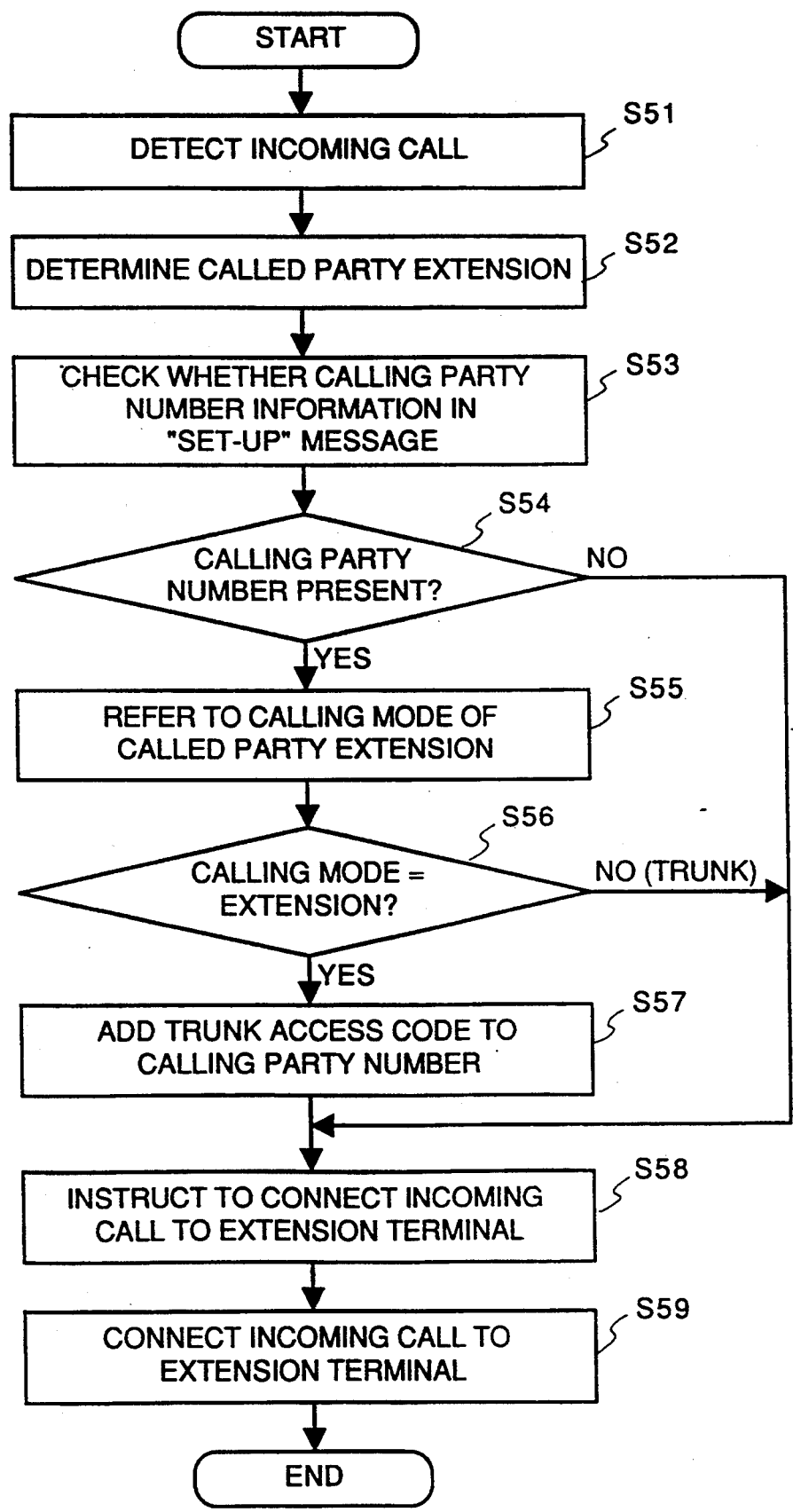
FIG. 5 is a flow chart showing a terminating sequence to which the present invention is applied.

FIG. 1 shows the arrangement of the PBX to which the present invention is applied. FIG. 5 is a flow chart showing a terminating sequence employed by the PBX shown in FIG. 1.

Referring to FIG. 1, a PBX 103 accommodates an ISDN line 102 as a trunk and is connected to an ISDN 101. A terminal 104 is an ISDN extension terminal of the PBX 103. A BRT 105 interfaces with the ISDN line 102 and detects an incoming call to the PBX 103 received via the ISDN 101. A BRI 106 interfaces with the extension terminal 104 and performs originating/terminating control of the extension terminal 104. A TSW 107 performs connection of a speech channel. A CC 108 controls the overall PBX 103. The control operations performed by the CC 108 include: determining a called party extension upon reception of an incoming call; checking whether calling party number information is included in the "set-up" message of the incoming call; adding a trunk access code to the calling party number; instructing the BRI 106 to connect the incoming call to the extension terminal 104; and the like. In addition, the CC 108 has a calling mode storage table for storing the calling mode of each extension of the PBX 103. Control signals are exchanged between the CC 108, the BRT 105, the BRI 106, the TSW 107, and the like through a control line 109. Note that a plurality of extension terminals and trunks are connected to the PBX 103.

FIG. 5 is a flow chart showing a terminating sequence employed by the PBX 103 having the arrangement shown in FIG. 1 so as to connect an incoming call to the extension terminal 104.

When a "set-up" message is sent from the ISDN 101 to the PBX 103 through the ISDN line 102, the BRT 105 detects reception of an incoming call (step S51). Assume that the "set-up" message includes calling party number information, and that a calling party number is the telephone number of the calling party. In this case, assume that the calling number is 037582414.

FIG. 3 shows the format of a "set-up" message. Each "set-up" message includes a calling party number information 31. FIG. 4 shows the format of the calling party information 31. As shown in FIG. 4, a calling party number is set in an area, of the calling party number information, which corresponds to octet 4 and subsequent bits.

The BRT 105 acknowledges the detection of an incoming call to the CC 108 through the control line 109. Upon reception of the acknowledgement of an incoming call, the CC 108 determines a called party extension (step S52).

Subsequently, the CC 108 checks whether calling party number information is included in the "set-up" message of the incoming call (step S53).

The CC 108 then tests the check result obtained in step S53 (step S54). If a calling party number is included in the message, the CC 108 reads a calling mode corresponding to the extension terminal number of the called party by referring to the calling mode storage table (step S55).

Assume that the calling mode storage table is in the memory incorporated in the CC 108, and that the table has the table structure shown in FIG. 2. In this table, the terminal numbers of the extension terminals connected to the PBX 103 and their calling modes are set in one-to-on correspondence.

The CC 108 tests the read calling mode (step S56). If the default designates an extension, the CC 108 adds the figure "0" to the head of the calling party number in the message (step S57). That is, if the calling party number is 037582414, the number is changed to 0037582414. When an extension terminal whose calling mode designates an extension is to generate an outgoing call to a trunk, the figure "0" is added to the calling party number to identify the type of call.

In contrast to this, if the calling mode designates a trunk, the calling party number is not changed. In addition, if it is determined on the basis of the test result in step S54 that no calling party number is included, the calling party number is not changed.

Subsequently, the CC 108 instructs the BRI 106 to connect the incoming call to the extension terminal 104 (step S58).

Upon reception of the connection instruction from the CC 108, the BRI 106 connects the incoming call to the extension terminal 104 (step S59).

Upon reception of the incoming call, the extension terminal 104 displays the calling party number on the display if it is included in the received "set-up" message. If no calling party number is included, the extension terminal 104 displays no number. In this case, if the calling mode of the extension terminal 104 designates a trunk, "037582414" is displayed as the calling party number. If the calling mode designates an extension, since the trunk access code "0" is added to the calling party number in step S57, "0037582414" is displayed.

After the terminating sequence is completed, the TSW 107 performs connection of a speech channel, and speech communication starts. The calling party number is then stored in the extension terminal 104. The stored number is the calling party number included in the "set-up" message. If the calling mode designates an extension, the number is 0037582414. If the default designates a trunk, the number is 037582414.

When the speech communication is completed, and an outgoing call is to be generated by the extension terminal 104 with respect to the trunk as the calling party of the previous speech communication, the operator performs a call-back operation. This operation is performed by the same known technique as that described as the conventional technique. With this operation, the extension terminal 104 reads out the previously received calling party number from the memory, and generates an outgoing call to the party of the read number. In this case, if the calling mode of the extension terminal 104 designates a trunk, "037582414" is stored, and an outgoing call is generated by using this number as a called party number. If the calling mode designates an extension, "0037582414" is stored, and an outgoing call is generated by using this number as a called party number.

As described above, if the calling mode designates an extension, a calling party number is stored with "0" added thereto. Therefore, with a simple call-back operation, the extension terminal 104 can generate an outgoing call to a party from which an incoming call has been previously received, regardless of whether the calling mode of the extension terminal 104 designates a trunk or an extension.

Note that the extension terminal 104 need not be an ISDN terminal. For example, the extension terminal 104 may be a multi-function telephone designed to store a calling party number upon reception of an incoming call through a trunk, and subsequently perform a call-back operation with respect to the party.

In addition, if the calling mode of each extension terminal is fixed to an extension, no calling mode needs to be identified.

As described above, according to the PBX of the first embodiment, since a calling party number with a trunk access code is sent to an extension terminal, even if the terminal generates an outgoing call without adding a trunk access code to the calling party number, no originating error is caused.

Second Embodiment

Figure 7:
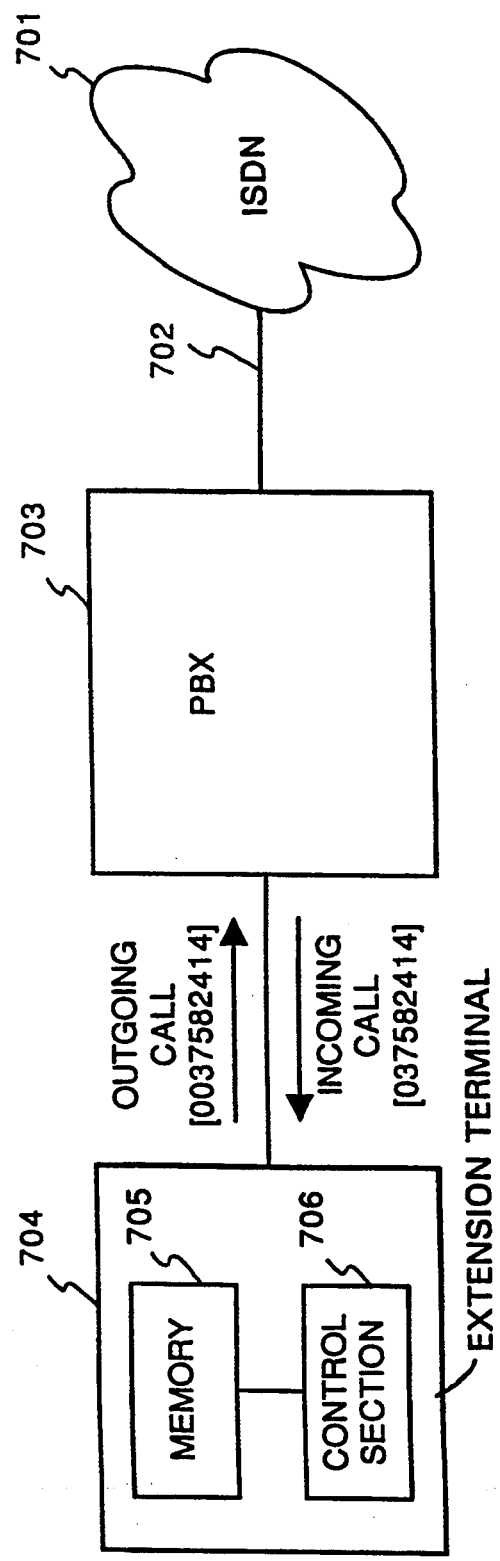
FIG. 7 is a block diagram showing the arrangement of an apparatus according to the second embodiment of the present invention.
Figure 8:
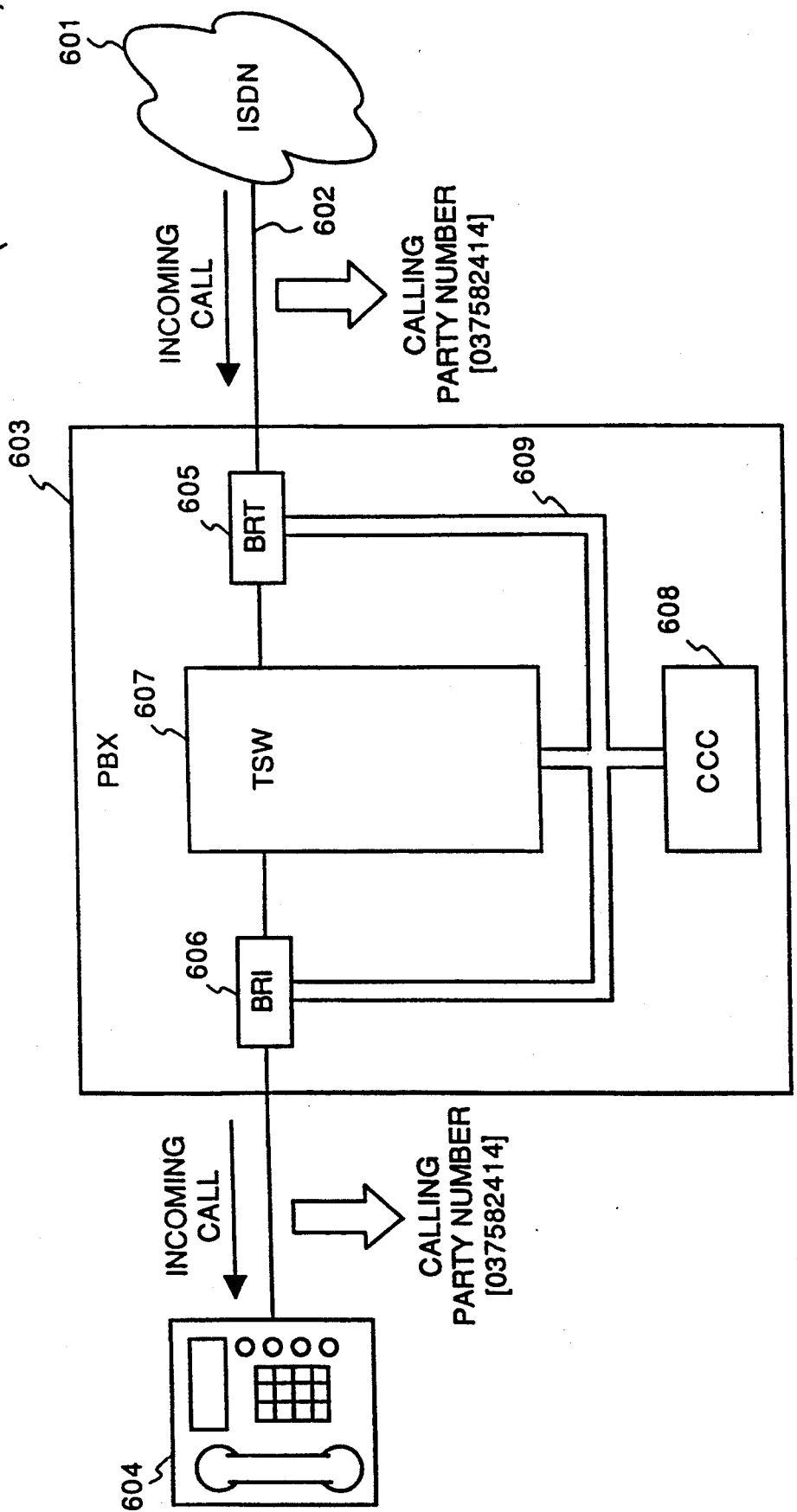
FIG. 8 is a block diagram showing a terminating sequence employed by a conventional private branch exchange.
Figure 9:
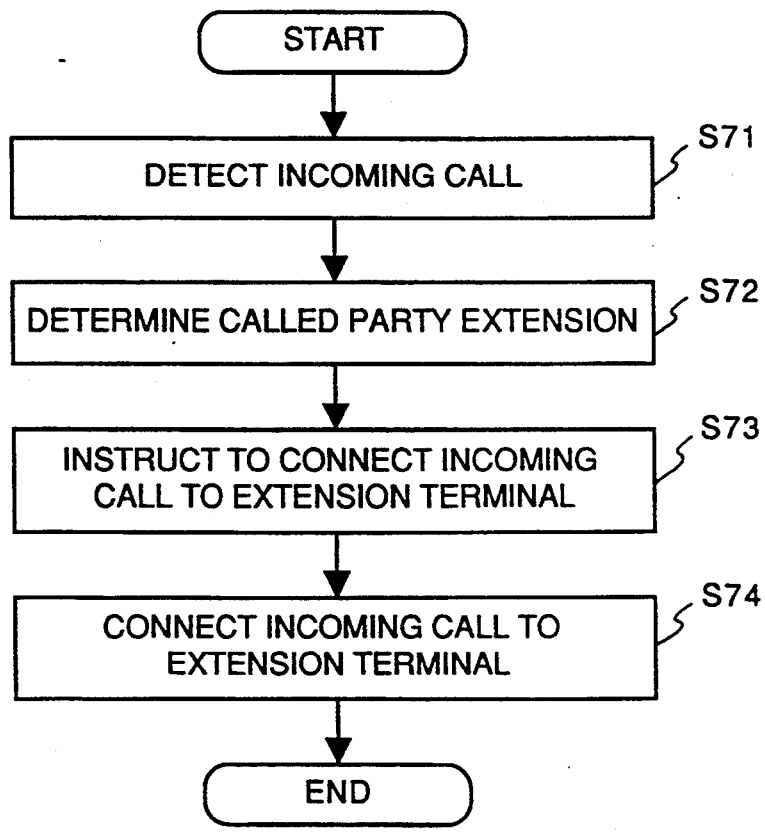
FIG. 9 is a flow chart showing a conventional terminating sequence.

The extension terminal 104 may store its calling mode in the internal memory. FIG. 7 shows the arrangement of a terminal 704 connected to an ISDN 701 through a PBX 703. In this case, the PBX 703 does not process a received calling party number. The extension terminal 704 directly stores a received calling party number in the memory.

Figure 6:
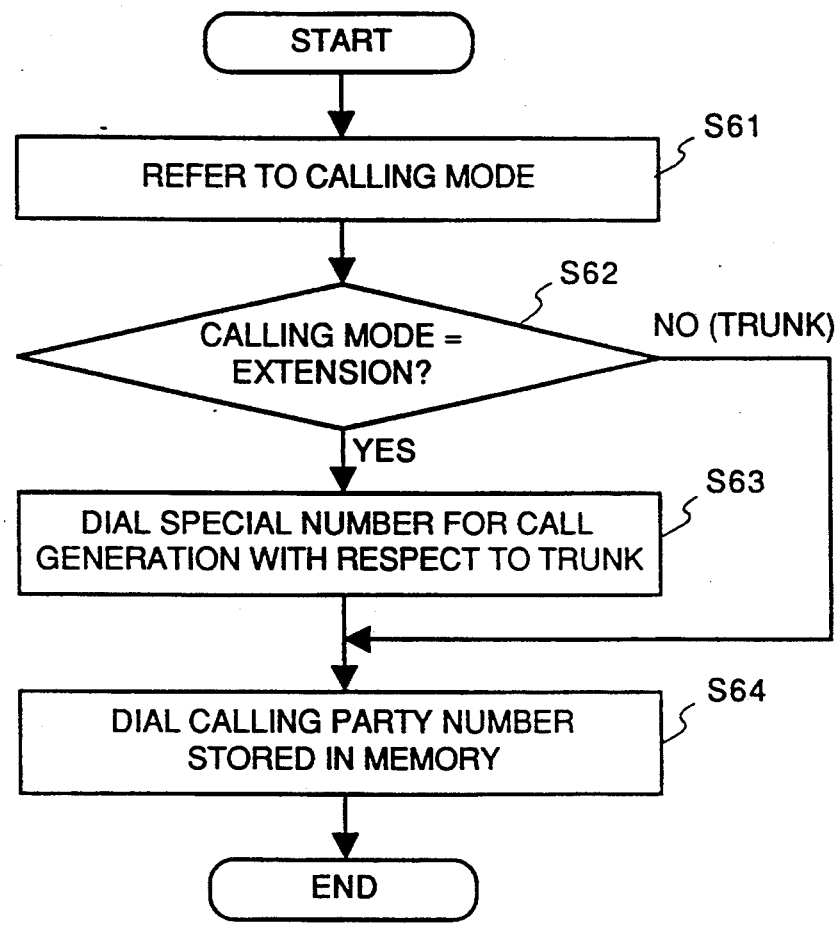
FIG. 6 is a flow chart showing a terminating sequence for executing the present invention.

FIG. 6 is a flow chart showing a sequence of a call-back operation using a stored number. This sequence is realized when a control section 706 of the extension terminal 704 having the arrangement shown in FIG. 7 executes a program stored in an internal memory 705.

The calling party number of a calling party of previous speech communication is stored in the memory 705. The sequence for this operation is known.

When the operator performs a call-back operation, the extension terminal 704 checks the calling mode by referring to the internal memory 705 (steps S61 and S62).

If the calling mode designates an extension, the extension terminal 704 dials a special number for an originating with respect to a trunk (step S63). If the calling mode designates a trunk, the processing in step S63 is not performed.

Subsequently, the calling party number stored in the memory 705 is dialed to generate an outgoing call to the party of the trunk (step S64).

Referring to FIG. 6, dialing is performed in steps S63 and S64. However, in these steps, numbers may only be stored in the memory, and outgoing calls may be generated later according to the stored numbers.

Note that the present invention can be applied to an extension facsimile apparatus connected to an extension of a PBX. In this case, the present invention can also be applied to a case wherein repeating of received information is performed. In this case, a calling mode designating an extension or a trunk is stored in the internal memory of the extension facsimile. Upon reception of a message from a trunk, the extension facsimile apparatus generates a call upon adding a trunk access code to the calling party number of a transfer destination included in the message.

As described above, according to the extension terminal or facsimile apparatus of the second embodiment, since a call is generated upon adding a trunk access code to a received number, an originating error can be prevented, which is caused when a call is generated without adding a trunk access code.

The present invention is not limited to the above embodiments and various changes and modifications can be made within the spirit and scope of the present invention. Therefore, to apprise the public of the scope of the present invention, the following claims are made.

What is claimed is:

1. A communication apparatus for communicating via a private network, comprising:
   reception means for receiving a calling party number through an external line of the private network;
   setting means for setting an extension calling mode for calling an extension terminal of the private network of an external calling mode for calling an external terminal of the private network as a calling mode of the apparatus;
   determination means for determining whether the extension calling mode or the external calling mode is set as the calling mode by said setting means; and
   output means for outputting the calling party number received by said reception means with an external line access code in a case where said determination means determines that the extension calling mode is set.

2. The apparatus according to claim 1, wherein said output means outputs the called party number to a display unit.

3. A communication apparatus for communicating via a private network, comprising:
   reception means for receiving a "set-up" message including a calling party number from an ISDN connected to the private network;
   setting means for setting an extension calling mode for calling an extension terminal of the private network or an extended calling mode for calling an external terminal of the private network as a calling mode of the apparatus;
   determination means for determining whether the extension calling mode or the external calling mode is set as a calling mode by said setting means; and
   output means for outputting the calling party number with an external line access code in a case where said determination means determines that the extension calling mode is set.

4. The apparatus according to claim 3, wherein said output means outputs the called party number to a display unit.

5. A communication apparatus for communicating via a private network, comprising:
   reception means for receiving a distant station number through an external line of the private network;
   setting means for setting an extension calling mode for calling an extension terminal of the private network or an external calling mode for calling an external terminal of the private network;
   determination means for determining whether the extension calling mode or the external calling mode is set as calling mode of the apparatus by said setting means; and
   output means for outputting the distant station number with an external line access code in a case where said determination means determines that the extension calling mode is set.

6. The apparatus according to claim 5, wherein said output means outputs the called party number to a display unit.

7. A control method for controlling a private network, comprising:
   a reception step of receiving a calling party number through an external line of the private network;
   a determination step of determining whether a calling mode of an extension terminal set by a setting unit designates an extension or an external line; and
   an output step of outputting the calling party number received in the reception step with an external line access code in a case where said determination step determines that the extension calling mode is set.

8. The method according to claim 7, wherein the output step outputs the calling party number to the extension terminal as the called party.

9. The method according to claim 7, wherein the reception step includes a step of receiving the calling party number included in a "set-up" message received from an ISDN.

10. The method according to claim 7, wherein the distant station number is output to a display unit in said output step.

11. A control method for controlling a private network, comprising:
    a reception step of receiving a "set-up" message including a calling party number from an ISDN connected to the private network;
    a determination step of determining whether a calling mode of an extension terminal as a called party which is set by a setting unit designates an extension or an external line; and
    an output step of outputting the calling party number with an external line access code in a case where said determination step determines that the calling mode designates the extension line.

12. A communication method for communicating via a private network, comprising:
    a reception step of receiving a distant station number through an external line of the private network;
    a determination step of determining whether a calling mode set by a setting unit designates an extension or external line; and
    an output step of outputting the distant station number with an external line access code in a case where said determination step determines that the extension calling mode is set.

13. The method according to claim 12, wherein the distant station number received in said reception step is a calling party number.

14. The method according to claim 12, wherein the distant station number is output to a display unit in said output step.

* * * * *